(No Model.)
S. A. HAWN.
WHEEL.
No. 389,469. Patented Sept. 11, 1888.
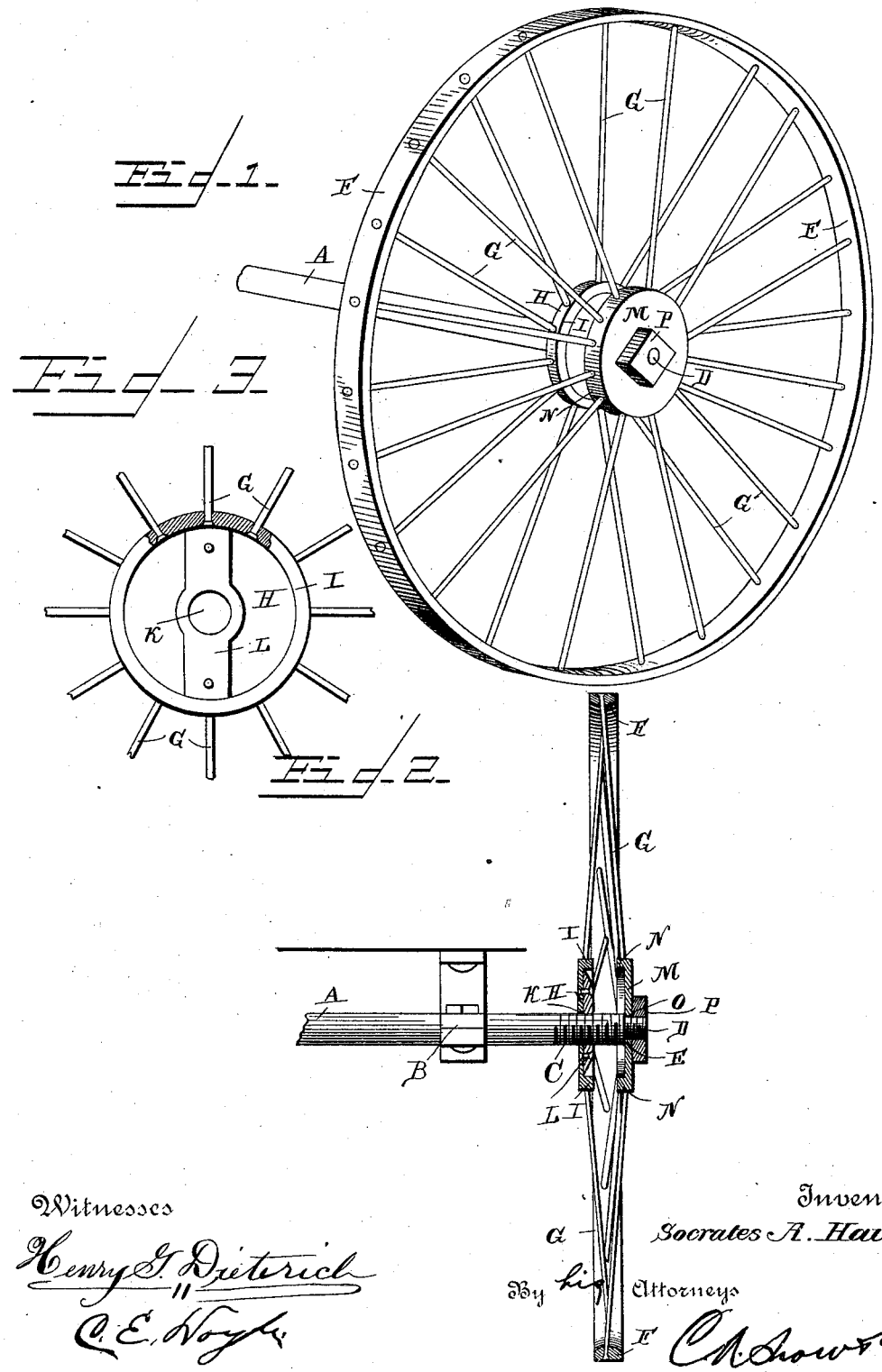
Witnesses
Henry G. Dieterich
C. E. Noyes
Inventor
Socrates A. Hawn
By his Attorneys

UNITED STATES PATENT OFFICE.

SOCRATES A. HAWN, OF HICKORY, NORTH CAROLINA, ASSIGNOR OF ONE-HALF TO RUDOLPH A. WEAVER, OF SAME PLACE.

WHEEL.

SPECIFICATION forming part of Letters Patent No. 389,469, dated September 11, 1888.

Application filed November 22, 1887. Serial No. 255,916. (No model.)

*To all whom it may concern:*

Be it known that I, SOCRATES A. HAWN, a citizen of the United States, residing at Hickory, in the county of Catawba and State of North Carolina, have invented new and useful Improvements in Wheels, of which the following is a specification.

My invention relates to improvements in wheels; and it has for its objects the provision of a light, simple, strong, easily-adjusted, and graceful wheel, suitable to be employed for carriages and other vehicles, and which may be cheaply manufactured.

The invention consists in a wheel which is attached to the end of the axle rigidly, so that the latter turns therewith. Each wheel is provided with a separate axle, which is mounted in a box or bearing attached to the under side of the vehicle. The end of the axle is threaded, and is provided with a threaded and reduced extension, having a shoulder at its inner end. The spokes of the wheel are of iron wire, preferably, which are secured at the outer ends in apertures in the rim or felly and at the inner ends to plates which are secured to the axle. The inner plate is provided with a central tapped opening which screws on the threaded portion of the axle, and the outer plate is provided with a plain opening which engages the reduced extension of the axle and bears against the shoulder at the inner end of the latter. It will be seen that as the wheel is turned around, the axle and the inner plate advances along the threaded portion of the same. As the outer plate is held from following the inner plate by the shoulder, the plates will be separated. The inner ends of the spokes are alternately secured to the plates, and therefore as the plates separate the ends of the spokes will separate and any desired tension may be put upon the rim to render it rigid.

The invention consists, further, in certain novel details of construction and arrangement, hereinafter more fully described in connection with the accompanying drawings, wherein—

Figure 1 is a perspective view of the wheel. Fig. 2 is a longitudinal section showing the manner of journaling the axle. Fig. 3 is an inner side elevation of the inner plate.

Referring by letter to the drawings, A designates the axle, which is mounted in the bearing B, and has its outer end threaded, as seen at C.

D represents the reduced portion of the axle, which is threaded and has the shoulder E at its inner end.

F represents the rim or felly of the wheel, which is provided with a series of apertures, in which the outer ends of the spokes G G are secured.

H represents the inner plate having an annular outwardly-extending flange, I, on its outer edge, which is provided with apertures similar to those in the rim. This plate is also provided at the center with a tapped opening, K, which is adapted to screw on the threaded portion of the axle. A boss or nut, L, is preferably formed or secured on the side of the plate H and provided with a tapped opening which registers with the opening in the plate. The object of this boss or nut is to provide a greater number of threads to engage the axle, and thereby render the construction stronger.

M designates the outer plate having an annular inwardly-extending flange, N, similar to the flange I and provided with apertures. This plate is provided with a central plain opening, O, which is adapted to receive and slide on the reduced portion of the axle. It will be seen that this plate will pass along the reduced portion of the axle until it comes in contact with the shoulder E at the inner end thereof, beyond which it cannot pass. The inner ends of alternate spokes are engaged in the apertures in the flanges I and N.

To secure the wheel on the axle, screw the inner plate on the threaded portion thereof until the outer plate bears against the shoulder E. If the inner plate is still further screwed on, it will be evident that the plates will be separated. This will cause the inner ends of alternate spokes to be separated, which will have the effect of drawing inwardly upon the rim or felly. The farther the inner plate is screwed on the more the plates will be separated and the greater will be the tension upon the rim, thus enabling the tension of the wheel to be adjusted at will. This manner of adjusting the wheel enables all the spokes to be tightened at the same time, thereby obviating the danger of twisting the wheel, which is often the result when the spokes are tightened separately. It is necessary, however, that the spokes should be of exactly the same length, so that the tension upon all shall be the same.

The drawings show the ends of the spokes swaged or spread on the outer side of the rim and the inner sides of the flanges to prevent the said ends from drawing through the apertures; but one or both ends of the spokes may be threaded and nuts screwed thereon, thereby enabling the lengths of the spokes to be accurately regulated. It will be understood that the lengths of the spokes must be regulated before the plates are screwed on the axle. After the desired tension of the wheel has been reached a nut, P, is screwed on the reduced extension of the axle until the plate M is clamped tightly against the shoulder E, thus preventing the wheel from becoming unscrewed and loosening the rim.

I preferably form the wheel of wrought-iron, and the manner of constructing it is such as to make it a suspension-wheel—that is, the weight upon the axle draws down upon the upper part of the rim and does not press upon the under or lower portion thereof, as is the case with the ordinary wooden wheels.

Having thus described my invention, I claim—

As an improvement in wheels, the combination, with the axle A, threaded at the end and having a reduced and threaded extension, D, provided at its inner end with a shoulder, E, of the inner plate, H, having a central tapped opening screwed on the axle and provided around the periphery with the outward-extending flange I, having apertures therein, the outer plate, M, having a smooth central opening mounted on the reduced extension of the axle and bearing against the shoulder E, the said plate being further provided with an inward-extending flange, N, provided with apertures, the apertured rim F, the spokes G, having headed outer ends engaged in the apertures in the rim and headed inner ends engaged alternately in the apertures in the flanges I and N, and the clamping or jam nut screwed on the threaded extension D and bearing against the outer side of the plate M, substantially as and for the purpose hereinbefore specified.

In testimony that I claim the foregoing as my own I have hereto affixed my signature in presence of two witnesses.

SOCRATES A. HAWN.

Witnesses:
T. T. HAY,
O. P. HAY.